(12) United States Patent
Yamamoto

(10) Patent No.: US 12,732,082 B2
(45) Date of Patent: Sep. 8, 2026

(54) MOTOR AND ARTICLE

(71) Applicant: CANON KABUSHIKI KAISHA, Tokyo (JP)

(72) Inventor: Takeshi Yamamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/761,177

(22) Filed: Jul. 1, 2024

(65) Prior Publication Data

US 2024/0356423 A1 Oct. 24, 2024

Related U.S. Application Data

(63) Continuation of application No. 17/880,470, filed on Aug. 3, 2022, now Pat. No. 12,046,977, which is a (Continued)

(30) Foreign Application Priority Data

Feb. 7, 2020 (JP) ................................ 2020-019512

(51) Int. Cl.

*H02K 41/06* (2006.01)
*F04D 13/06* (2006.01)
*F04D 25/06* (2006.01)

(52) U.S. Cl.

CPC ............. *H02K 41/06* (2013.01); *F04D 13/06* (2013.01); *F04D 25/06* (2013.01)

(58) Field of Classification Search

CPC ...... H02K 41/06; H02K 1/278; H02K 11/215; H02K 21/14; H02K 7/09; F04D 13/06;

(Continued)

(56) References Cited

U.S. PATENT DOCUMENTS 5,952,744 A * 9/1999 Chitayat ................ H02K 21/12 310/15
2009/0121571 A1* 5/2009 Onuma .................. H02K 21/00 310/90.5

(Continued)

FOREIGN PATENT DOCUMENTS

JP H11313462 A 11/1999
JP 2011041406 A 2/2011

(Continued)

OTHER PUBLICATIONS

English translation of JP-5762906-B2 (Year: 2015).*
English translation of JP-2011188567-A (Year: 2011).*

*Primary Examiner* — Tulsidas C Patel
*Assistant Examiner* — Joshua Kiel M Rodriguez
(74) *Attorney, Agent, or Firm* — Canon U.S.A., Inc. IP Division

(57) ABSTRACT

A motor including a first part having an outer peripheral portion and a second part having an inner peripheral portion facing the outer peripheral portion, the first part and the second part being configured to rotate relative to each other, includes a plurality of coils on one of the outer peripheral portion and the inner peripheral portion, and a plurality of magnets on the other of the outer peripheral portion and the inner peripheral portion at positions facing the plurality of coils, wherein the plurality of magnets includes a first magnet portion configured to apply a thrust to at least one of the plurality of coils in a rotation direction and a second magnet portion configured to apply a thrust to at least one of the plurality of coils in a direction intersecting the rotation direction, when an electric current is applied to the plurality of coils.

14 Claims, 13 Drawing Sheets

Related U.S. Application Data continuation of application No. PCT/JP2021/001848, filed on Jan. 20, 2021.

(58) Field of Classification Search
CPC .. F04D 25/06; F16C 2380/26; F16C 32/0412; F16C 32/0417; F16C 32/0474
See application file for complete search history.

(56) References Cited

U.S. PATENT DOCUMENTS

| | | | | |
|---|---|---|---|---|
| 2016/0218586 | A1* | 7/2016 | Li | H02K 23/40 |
| 2017/0033650 | A1* | 2/2017 | Mikami | H02K 1/2713 |
| 2019/0199186 | A1* | 6/2019 | Noh | H02K 21/20 |

FOREIGN PATENT DOCUMENTS

| | | | | |
|---|---|---|---|---|
| JP | 2011188567 | A | * | 9/2011 |
| JP | 2015081991 | A | | 4/2015 |
| JP | 5762906 | B2 | * | 8/2015 |

* cited by examiner

Or
102-9
102-8
102-7
102-6
102-5
102-4
102-3
102-2
102-1
Or
102-9
Z
105c
N
S
N
S
N
S
N
S
N
S
N
S
N
S
N
N
S
N
Wz
θ1

204-1
204-6
204-5
204-4
204-3
204-2
216a
204-1
j = 1
j = 6
j = 5
j = 4
j = 3
j = 2
j = 1
Wz
Oc
Oc

Ed(5,θ1)
Eq(4,θ1)
Eq,Ed
Wz
Eq(5,θ1)
Ed(4,θ1)

Ez
Wz
Ez(5,θ1)
Ez(4,θ1)
Z
Wz
R

Or
802-1
802-2
802-3
802-4
802-5
802-6
Or
N
S
N
S
N
S
N
S
n
801
Wz
Z
R
Wz

Or
902-9
S
902-1
N
902-2
N
902-3
S
902-4
N
902-5
N
902-6
S
902-7
N
902-8
N
902-9
S
Or
902-1
N
Wz
Z
R
Wz

MOTOR AND ARTICLE

CROSS-REFERENCE TO RELATED APPLICATIONS

This application is a Continuation, and claims the benefit, or U.S. patent application Ser. No. 17/880,470, presently pending and filed on Aug. 3, 2022, which is a Continuation of International Patent Application No. PCT/JP2021/001848, filed Jan. 20, 2021, which claims the benefit of Japanese Patent Application No. 2020-019512, filed Feb. 7, 2020, both of which are hereby incorporated by reference herein in their entireties.

BACKGROUND OF THE INVENTION

Field of the Invention

The present invention relates to a motor including a rotor and a stator, and an article. The rotor rotates in a contactless state about an axis line of the rotor.

Background Art

As applications of a rotating machine configured to rotate a rotor in a contactless state by magnetic action, there are, for example, a magnetic levitation rotation motor, a high speed rotating machine, and a high-speed spindle for a machine tool, and further, there is a vacuum pump as an application example thereof.

As one type of magnetic levitation, there is a type that controls the position of the rotor in an axial direction and rotation of the rotor, in the axial direction of the rotor (see PTL 1).

CITATION LIST

Patent Literature

PTL 1: Japanese Patent Laid-Open No. 2012-251486

In the method discussed in PTL 1, however, there is an issue that the entire motor increases in size because a plurality of coils is disposed, including a coil for a radial bearing in an upper part, a motor for generating a rotational force, and an axial bearing in a lower part.

SUMMARY OF THE INVENTION

According to an aspect of the present invention, a motor including a first part having an outer peripheral portion and a second part having an inner peripheral portion facing the outer peripheral portion, the first part being configured to rotate relative to the second part each other, includes a plurality of coils on one of the outer peripheral portion and the inner peripheral portion, and a plurality of magnets on the other of the outer peripheral portion and the inner peripheral portion at positions facing the plurality of coils, wherein the plurality of magnets includes a first magnet portion and a second magnet portion, the first magnet portion being configured to apply a thrust to at least one of the plurality of coils in a rotation direction, the second magnet portion being configured to apply a thrust to at least one of the plurality of coils in a direction intersecting the rotation direction, when an electric current is applied to the plurality of coils.

Further features of the present invention will become apparent from the following description of exemplary embodiments with reference to the attached drawings.

DESCRIPTION OF THE EMBODIMENTS

A first exemplary embodiment will be described below with reference to FIG. 1A to FIG. 7, as an example of a motor of the present invention.

Figure 1A:
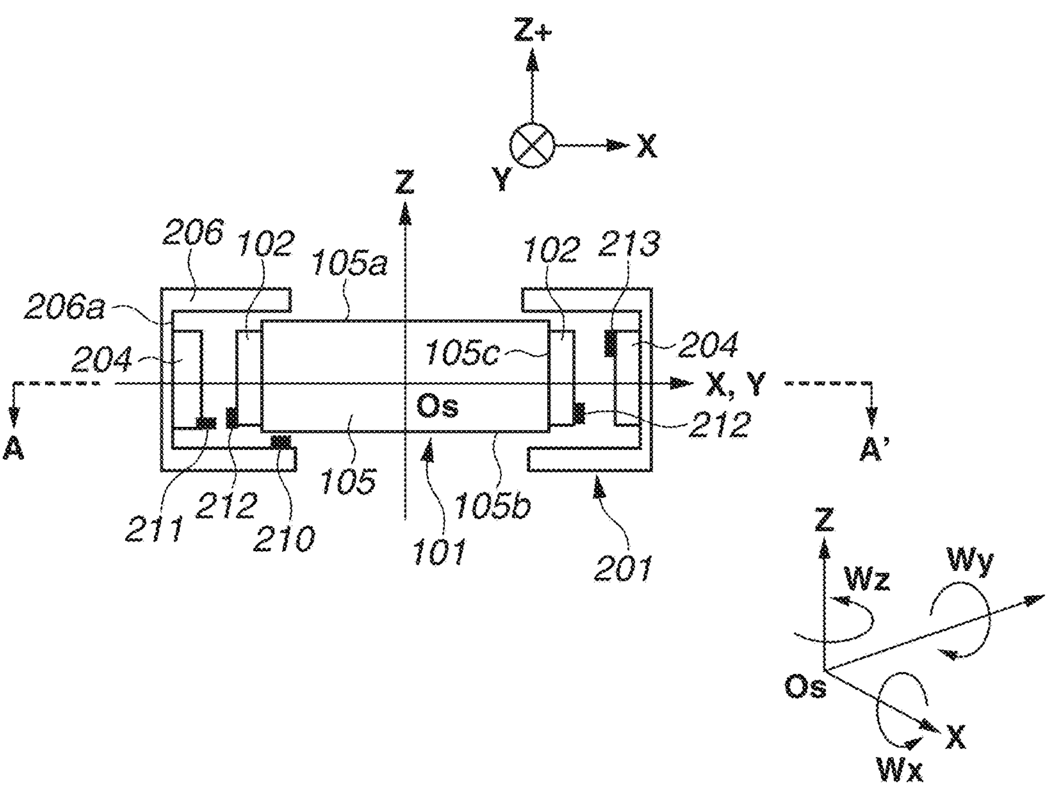
FIG. 1A is a schematic diagram illustrating a first exemplary embodiment of the present invention.
Figure 1B:
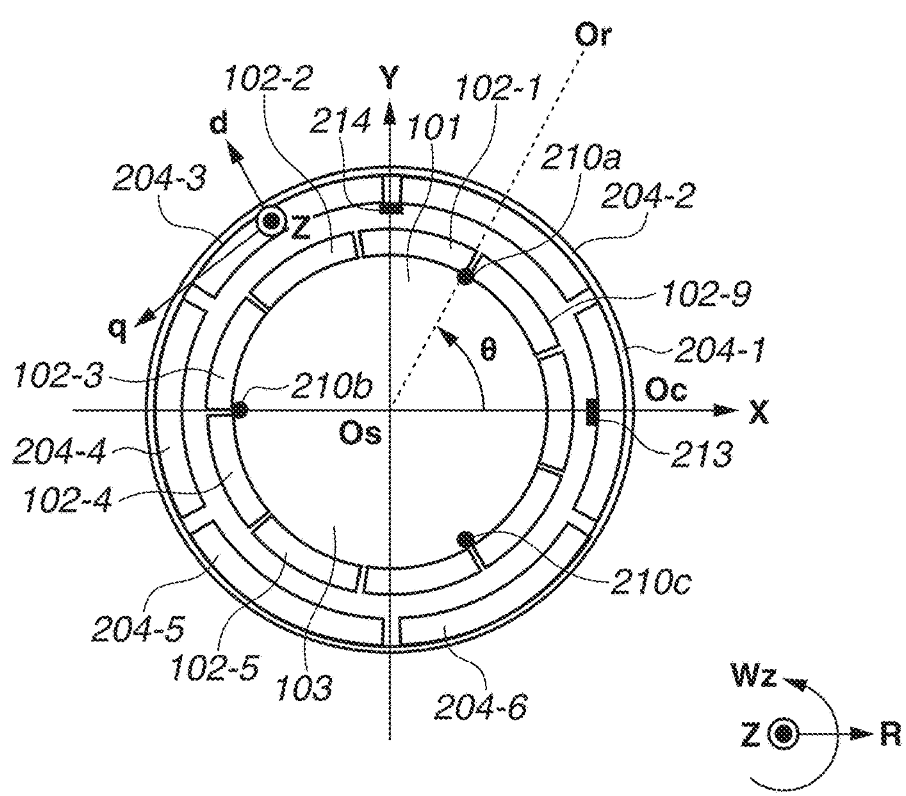
FIG. 1B is a schematic diagram illustrating the first exemplary embodiment of the present invention.

FIGS. 1A and 1B are conceptual diagrams illustrating a motor. FIG. 1A is a longitudinal cross-sectional conceptual diagram, and FIG. 1B is a cross-sectional conceptual diagram along A-A' in FIG. 1A.

In FIGS. 1A and 1B, a rotor 101 and a stator 201 are illustrated. The rotor 101 rotates in a state of floating (in a contactless manner) with respect to the stator 201. The rotor 101 has a base portion 105 and a plurality of permanent magnets 102. The base portion 105 has a first surface 105*a*, a second surface 105*b*, and an outer peripheral portion 105*c* including an outer peripheral surface connecting the first surface 105*a* and the second surface 105*b*. The plurality of permanent magnets 102 is attached to the outer peripheral portion 105*c* of the base portion 105. The permanent magnets may be attached with another member such as a yoke interposed between the peripheral portion of the base portion and the permanent magnets. The stator 201 has a housing 206, and a plurality of coils 204 attached to positions located on an inner peripheral portion 206*a* that is an inner peripheral surface of the housing 206 and facing the permanent magnets 102 of the rotor 101. The coils may be attached with another member interposed between the inner peripheral portion of the housing and the coils.

In FIGS. 1A and 1B, the rotor 101 and the stator 201 are illustrated, but a rotor 201 and a stator 101 may be provided. In other words, the housing 206 may be connectable to a fixed member such as a frame, or the base portion 105 may be connectable to a fixed member such as the frame.

In other words, in a case where a first part 101 and a second part 201 are provided, the first part 101 may rotate relative to the second part 201, or the second part 201 may rotate relative to the first part 101. While the example in which the plurality of permanent magnets is attached to the rotor (the first part) 101 and the coils are attached to the stator (the second part) 201 is illustrated, the coils may be attached to the rotor (the first part) 101 and the permanent magnets (a ferromagnet) may be attached to the stator (the second part) 201.

Coordinate axes, directions, and the like to be used in the following description will be defined here. An axis about which the rotor 101 rotates is a Z-axis, and a direction of the Z-axis is a Z-axis direction. In other words, the Z-axis direction is a direction parallel with a rotation axis. An X-axis is set in a direction orthogonal to the Z-axis direction, and a direction of the X-axis is an X-axis direction. A Y-axis is set in a direction orthogonal to the X-axis direction and the Z-axis direction, and a direction orthogonal to the X-axis direction and the Z-axis direction is a Y-axis direction. Rotation about the Z-axis is rotation Wz, rotation about the X-axis is rotation Wx, and rotation about the Y-axis is rotation Wy. A forward direction of the rotation is the direction of a right-handed screw with respect to a direction in which each axis extends in the +direction from an origin Os of the stator 201.

Further, an R-axis is set in a radial direction (in a direction in which the radius increases).

As an index of a coil in a group of coils to be described below, a sign "j (=1 to 6)" is used.

In the present exemplary embodiment, the coils will be simply referred to as "coil 204" unless it is necessary to distinguish one coil 204 from another. In a case where it is necessary to identify each of the coils 204 individually, the coils 204 will be individually referred to as a coil 204-1, a coil 204-2, . . . , and a coil 204-6.

Similarly, the permanent magnets will be simply referred to as "permanent magnet 102". In a case where it is necessary to identify each of the permanent magnets 102 individually, the permanent magnets 102 will be individually referred to as, for example, a permanent magnet 102-1, a permanent magnet 102-2, . . . , and a permanent magnet 102-9. An electromagnet may be used in place of the permanent magnet.

The size of an angle of the rotation Wz of the rotor 101 is an angle θ.

A reference Oc of the rotation Wz about the Z-axis on the stator 201 side is the center of the coil 204-1.

A reference Or of the rotation Wz on the rotor 101 side is midway between the permanent magnets 102-1 and 102-9.

The angle θ is an angle from the reference Oc on the stator 201 side to the reference Or on the rotor 101 side.

As illustrated in FIGS. 2A to 2D to be described below, a group of permanent magnets 102-1 to 102-9 that are magnetized is attached to the outer peripheral portion 105*c* of the base portion 105 of the rotor 101 in a first magnetization direction in a rotation direction (circumferential direction) of the rotor 101. The group of permanent magnets includes a first group of permanent magnets 102-1, 102-3, 102-4, 102-6, 102-7, and 102-9 alternately magnetized in the first magnetization direction. The group of permanent magnet also includes a second group of permanent magnets 102-2, 102-5, and 102-8 magnetized in a second magnetization direction intersecting the first magnetization direction. A yoke board (not illustrated) may be attached to a back side (a side opposite to the surface facing the stator) of the permanent magnet 102 in order to increase a magnetic force. In addition, a cover (not illustrated) may be attached to cover the plurality of permanent magnets 102.

The plurality of coils 204 is attached to the inner peripheral portion 206*a* of the housing 206 of the stator 201 at the positions facing the permanent magnets of the rotor 101 in the circumferential direction of the stator 201. Each of the coils 204 has a conducting wire wound around an iron core or air core. An electro-magnetic force that acts between the coils 204 and the permanent magnets 102 by application of an electric current to the coils 204 causes the rotor 101 to rotate about the Z-axis with respect to the stator 201.

A cover (not illustrated) may be attached to the plurality of coils 204 to cover the coils 204.

An X-sensor 213 and a Y-sensor 214 are attached to the stator 201. The X-sensor 213 can detect a distance between the rotor 101 and the X-sensor 213 in the X-axis direction. The Y-sensor 214 can detect a distance between the rotor 101 and the Y-sensor 214 in the Y-axis direction.

Further, a Wz-sensor 211 is attached to the stator 201. In addition, a scale 212 is attached to a surface facing the Wz-sensor 211 of the rotor 101. The Wz-sensor 211 can detect a rotation angle of the rotor 101 by reading a pattern on the scale 212 of the rotor 101.

Z-sensors 210*a* to 210*c* are attached to the stator 201 at three places. The Z-sensors 210 can detect a distance of a gap (a space) to the rotor 101 in the Z-axis direction. With regard to the gap thereto in the Z-axis direction, a spacer (not illustrated) may be installed to keep the distance uniform.

Figure 3:
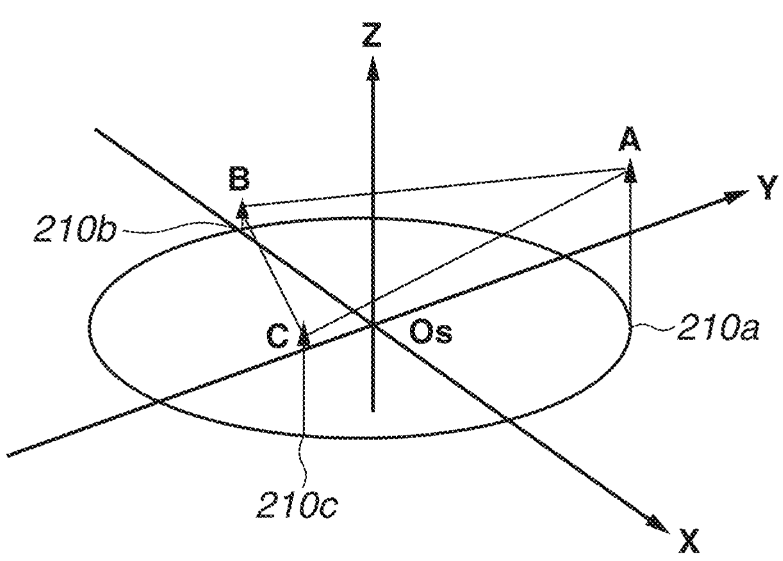
FIG. 3 is a schematic diagram illustrating the first exemplary embodiment of the present invention.

Here, a method of calculating a displacement of the rotor 101 in the Z-axis direction, the Wx-axis direction, and the Wy-axis direction using the three Z-sensors 210*a* to 210*c* will be described with reference to FIG. 3. A plane ABC is defined based on a detection value of each of the three Z-sensors 210*a*, 210*b*, and 210*c*. Displacement (Z, Wx, Wy), i.e., a slope, of the plane ABC, i.e., the rotor 101, with respect to the stator 201 can be calculated from the slope of the normal vector of the plane ABC, the origin Os, and the distance to the plane ABC.

Figures 2A, 2B, 2C, 2D:
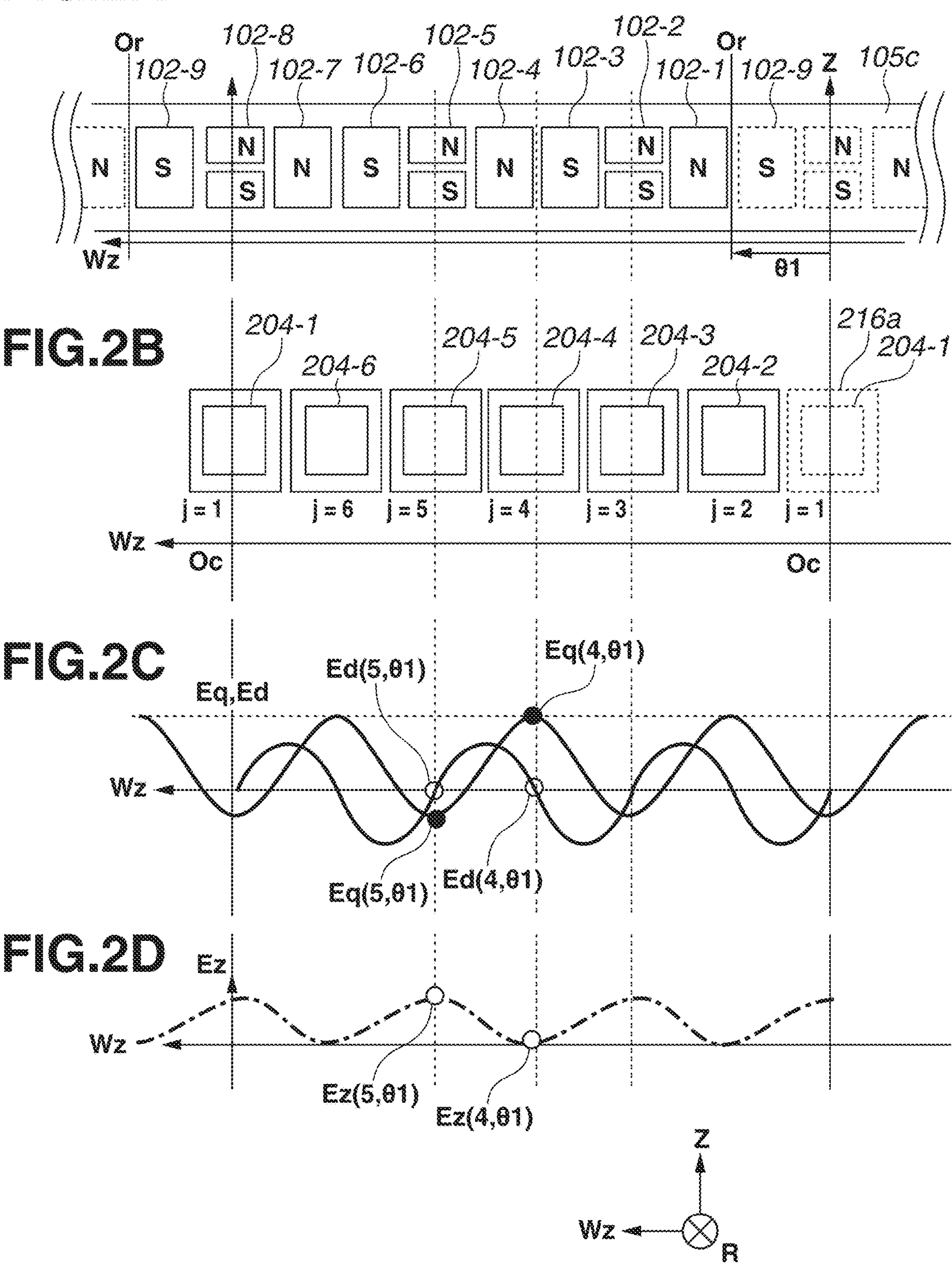
FIG. 2A is a schematic diagram illustrating the first exemplary embodiment of the present invention.
FIG. 2B is a schematic diagram illustrating the first exemplary embodiment of the present invention.
FIG. 2C is a schematic diagram illustrating the first exemplary embodiment of the present invention.
FIG. 2D is a schematic diagram illustrating the first exemplary embodiment of the present invention.

FIG. 2A is a diagram schematically illustrating an arrangement of the permanent magnets 102 of the rotor 101, and schematically illustrates the outer peripheral portion 105*c* of the base portion 105 in a developed manner.

The permanent magnet 102 is magnetized in a direction of a surface facing the coil, for example, as illustrated in FIG. 2A. Specifically, for example, in each of the permanent magnets 102-1, 102-4, and 102-7, the surface facing the coil is magnetized to the N-pole, and in each of the permanent magnets 102-3, 102-6, and 102-9, the surface facing the coil is magnetized to the S-pole. The permanent magnets 102-2, 102-5, and 102-8 are divided into two in the Z-axis direction, and each of the permanent magnets 102-2, 102-5, and 102-8 is magnetized to the N-pole and the S-pole. An array formed by the permanent magnets 102-1 to 102-9 in the circumferential direction constitutes a group of permanent magnets. In the group of permanent magnets, the permanent magnets 102-2, 102-5, and 102-8, each divided into two in the Z-axis direction and magnetized, are included as the second group of permanent magnets.

FIG. 2B is a diagram schematically illustrating the arrangement of the coils 204, and schematically illustrates the inner peripheral portion 206*a* of the cover of the stator 201 in a developed manner.

An example in which there are six coils 204 in total is illustrated.

FIGS. 2C and 2D are diagrams schematically illustrating the magnitude of torque generated in a q-axis, a d-axis, and the Z-axis per unit electric current in the coils 204 in a case where the rotor 101 is at an angle θ1, i.e., illustrating thrust constants (Eq, Ed, Ez).

The q-axis and the d-axis illustrated herein indicate a q-axis and a d-axis in the motor vector control theory, and the directions of the q-axis and the d-axis with respect to the coil 204-3 as a representative example are illustrated in FIG. 1B. The q-axis is the circumferential direction, and the d-axis is the radial direction.

The magnitude of each of the thrust constants (Eq, Ed, Ez) varies depending on the rotation angle θ of the rotor 101 and the index j of the coil. The first argument of each of the thrust constants (Eq, Ed, Ez) represents the index (j, 1 to 6) of the coil 204, and the second argument represents the angle θ of the rotor 101.

In FIG. 2A where (θ=θ1), the coil 204-4 is located substantially midway between the permanent magnet 102-3 having the S-pole facing surface and the permanent magnet 102-4 having the N-pole facing surface.

In this case, when the unit electric current is applied to, for example, the coil 204-4 so that the N-pole appears on the side facing the permanent magnets 102-3 and 102-4, an attraction force and a repulsive force act with respect to the permanent magnet 102-3 and the permanent magnet 102-4, respectively. Thus, a thrust (Eq (4, θ1)) is applied to the coil 204-4 in the q-axis direction. Meanwhile, a thrust (Ed (4, θ1)) of the d-axis and a thrust (Ez (4, θ1)) in the Z-axis direction are relatively small.

Similarly, when the unit electric current is applied to the coil 204-5 so that the N-pole appears on the side facing the permanent magnet 102-5, a thrust (Ez (5, θ1)) in the Z-axis direction acts on the coil 204-5, since the permanent magnet 102-5 is divided into the N-pole and the S-pole in the Z-axis direction.

Further, with a force acting on each of the permanent magnets 102-4 and 102-6, a relatively small thrust (Eq (5, θ1)) also acts on the q-axis. A thrust (Ed (5, θ1)) of the d-axis is also small.

The force acting on the coil 204 can be handled equivalently to a reaction force acting on the rotor 101, and therefore, in a case where, for example, a thrust is generated in the positive direction of the q-axis in the coil, a thrust in the negative direction of the q-axis is generated in the rotor 101.

Figure 4:
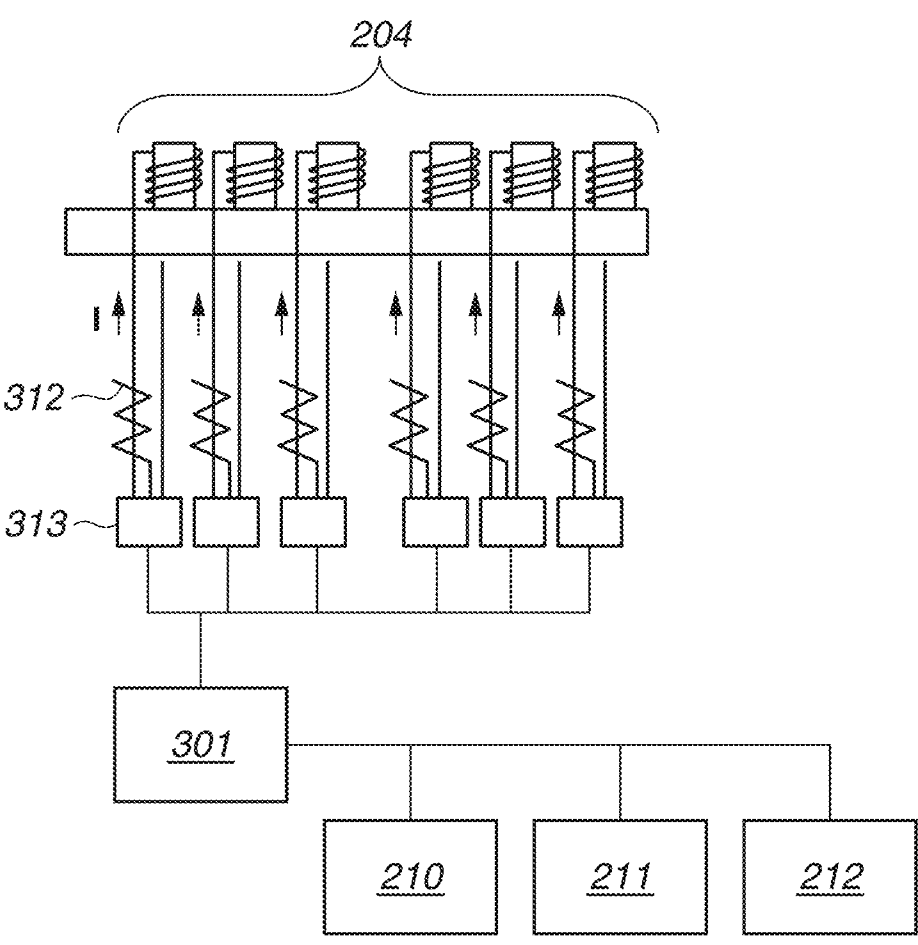
FIG. 4 is a schematic diagram illustrating the first exemplary embodiment of the present invention.

A current control system will be described with reference to FIG. 4.

The coils 204 are each connected to a current controller 313 individually.

A current sensor 312 is connected to the current controller 313 to be able to detect a current value of each of the coils 204.

The current controller 313 is connected to a motor controller 301. The current controller 313 can apply a predetermined electric current to each of the coils 204 independently while detecting a current amount using the current sensor 312 based on a current command value from the motor controller 301.

The Z-sensors 210, the Wz-sensor 211, the X-sensor 213, and the Y-sensor 214 are connected to the motor controller 301 to be able to detect a displacement (X, Y, Z, Wx, Wy, Wz) of the rotor 101. The position of the motor controller 301 is not particularly limited, but it is desirable that the motor controller 301 be disposed at the center of the rotor 101. In addition, the method of supplying power to the motor controller 301 is not particularly limited, and, for example, the power may be supplied wirelessly.

The motor controller 301 has a control program and a clock oscillator built therein, and can calculate a current value corresponding to the displacement of the rotor and apply an electric current to each of the coils 204.

Figure 5:
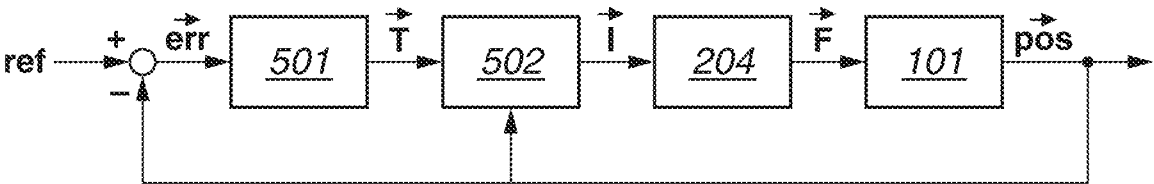
FIG. 5 is a schematic diagram illustrating the first exemplary embodiment of the present invention.

A method of controlling an attitude of the rotor 101 by the motor controller 301 will be described with reference to FIG. 5. FIG. 5 schematically illustrates a control loop for calculating the magnitude of a force to be applied to the rotor 101.

A target value ref is a target value of a displacement of the rotor 101, and a displacement pos is a displacement of the rotor 101 obtained from a group of sensors (the Z-sensor 210, the Wz-sensor 211, the X-sensor 213, and the Y-sensor 214). An attitude controller 501 calculates torque T to be applied to the rotor 101 in order to drive the rotor to a target attitude position based on a difference err between the target value ref and the displacement pos.

A current calculator 502 determines an electric current I to be applied to the coil 204 based on the torque T and the displacement pos.

An electro-magnetic force F thereby occurs between the coil 204 and the rotor 101 and acts on the rotor 101. The attitude (the tilt) of the rotor is thereby controlled, and the displacement pos is detected again, and the loop is repeated.

The attitude controller 501 may also be controlled by, for example, a proportional-integral-derivative (PID) controller, so that the attitude of the rotor 101 can be stabilized by, for example, appropriately adding a filter depending on characteristics of the rotor 101.

A torque vector Tq to be applied to the rotor 101 is expressed by the following equation (1). Tx, Ty, and Tz represent the magnitude of a force in the X-axis direction, the magnitude of a force in the Y-axis direction, and the magnitude of a force in the Z-axis direction, respectively. Further, Twx, Twy, and Twz represent the magnitude of a moment force about the X-axis, the magnitude of a moment force about the Y-axis, and the magnitude of a moment force about the Z-axis, respectively.

A control system according to the present exemplary embodiment rotates the rotor 101 while controlling the attitude (X, Y, Z, Wx, Wy, Wz) of the rotor 101 by controlling the torque vectors Tq (Tx, Ty, Tz, Twx, Twy, Twz).

$$Tq=(Tx,Ty,Tz,Twx,Twy,Twz) \tag{1}$$

A current vector Is is defined as an electric current to be applied to the coil 204.

$$Is=(I1,I2,I3,I4,I5,I6) \tag{2}$$

Figure 6A:
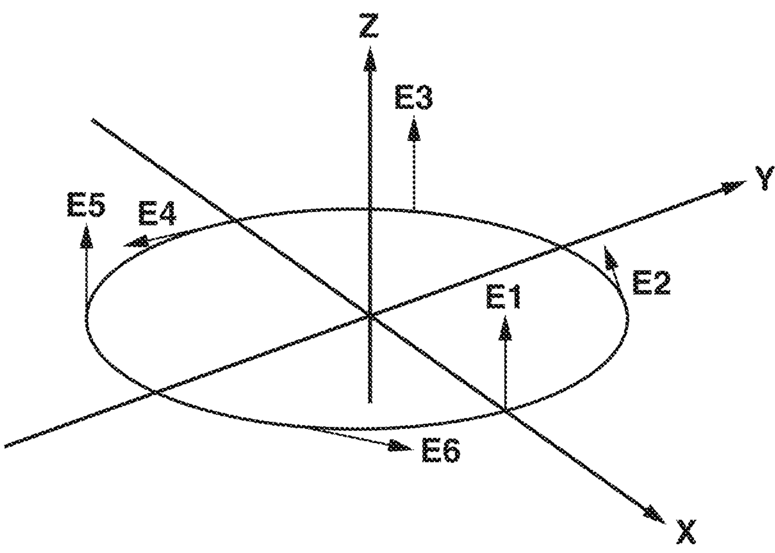
FIG. 6A is a schematic diagram illustrating the first exemplary embodiment of the present invention.
Figure 6B:
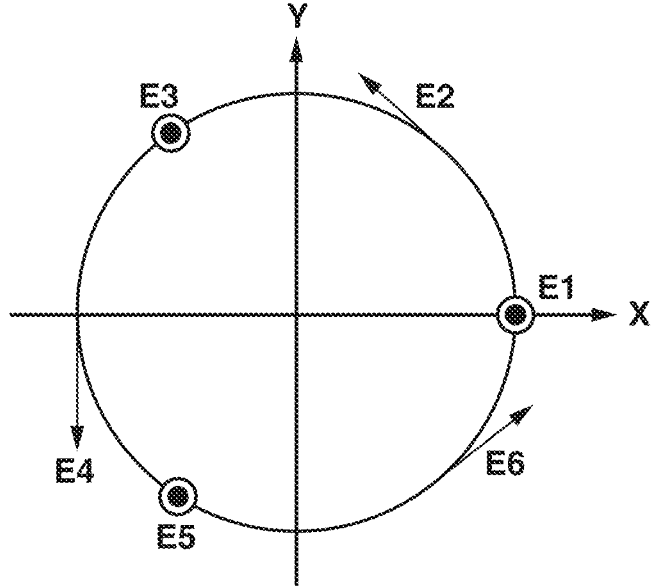
FIG. 6B is a schematic diagram illustrating the first exemplary embodiment of the present invention.
Figure 7:
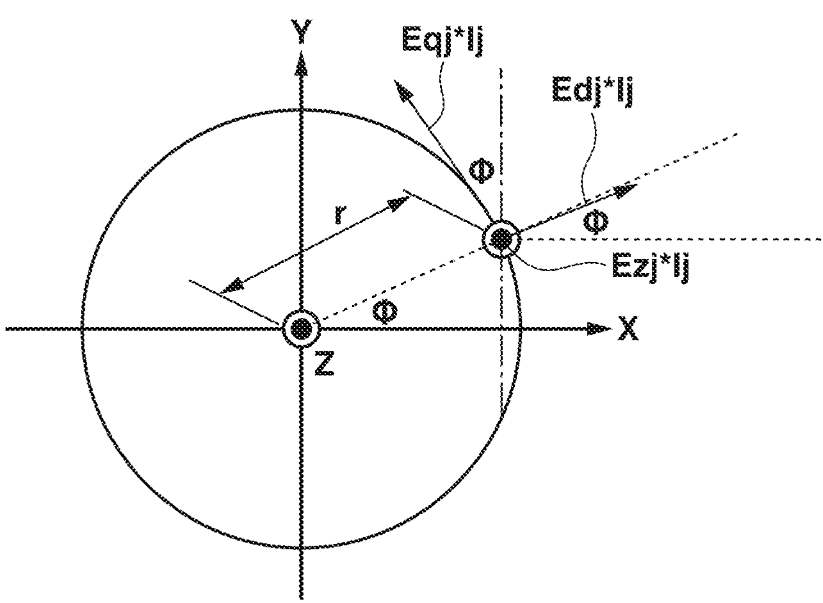
FIG. 7 is a schematic diagram illustrating the first exemplary embodiment of the present invention.

FIG. 6A and FIG. 6B schematically illustrate a thrust (E) that acts on the rotor 101 in a case where the unit electric current is applied to each of the coils in the state of θ=θ1 in FIGS. 2A to 2D.

The force in the Z-axis direction mainly acts on the coils 204-1, 204-3, and 204-5 by interaction thereof with the permanent magnets on the rotor side, and, similarly, the force in the q-axis direction mainly acts on the coils 204-2, 204-4, and 204-6. FIG. 6A is a perspective view, and FIG. 6B is a view of a rotational state of the rotor as viewed from above on the Z-axis.

As illustrated in these views, forces E2, E4, and E6 are forces acting within an XY plane. The forces within the XY plane and moment forces (Tx, Ty, Twz) can be generated by setting the current value of the coil corresponding to each of the forces E2, E4, and E6.

Similarly, by setting the current value of the coil corresponding to each of forces E1, E3, and E5, the forces in the Z-axis, Wx-axis, and Wy-axis directions and moment forces (Tz, Twx, Twy) can be generated.

FIGS. 6A and 6B correspond to θ=θ1 in FIG. 2. The torque vector Tq can be applied to the rotor 101 at any angle of the rotation (Wz) of the rotor 101 by moving a magnetic field generated in the coil 204 based on the rotation of the rotor 101, and this will be described with reference to FIG. 7.

First, signs are defined as follows.

j: coil index (j=1 to 6)

Ij: current value to be applied to j-th coil

Is=column vector of (I1, I2, I3, I4, I5, I6)

φj: angle of j-th coil in Wz-axis direction r: radius to permanent magnet 102

Eq (j, θ): force per unit electric current in q-axis direction acting between j-th coil and rotor 101 (angle θ)

Ed (j, θ): force per unit electric current in d-axis direction acting between j-th coil and rotor 101 (angle θ)

Σ: sum in a case where index j is changed from 1 to 6

The elements of the torque vector Tq=(Tx, Ty, Tz, Twx, Twy, Twz) are given by the following equations.

$$Tx = \sum\{(-Eq\,(j,\theta) * \mathrm{Sin}\,\varphi j + Ed\,(j,\theta) * \mathrm{Cos}\,\varphi j) * Ij\} \tag{3-1}$$

$$Ty = \sum\{(Eq\,(j,\theta) * \mathrm{Cos}\,\varphi j + Ed\,(j,\theta) * \mathrm{Sin}\,\varphi j) * Ij\} \tag{3-2}$$

$$Tz = \sum(Ez\,(j,\theta) * Ij) \tag{3-3}$$

$$Twx = \sum(Ed(j,\theta) * r * \mathrm{Sin}\,\varphi j * Ij) \tag{3-4}$$

$$Twy = \sum(-Eq(j,\theta) * r * \mathrm{Cos}\,\varphi j * Ij) \tag{3-5}$$

$$Twz = \sum(Eq(j,\theta) * r * Ij) \tag{3-6}$$

To apply the desired torque vector Tq, the electric current Ij satisfying the above-described equations (3-1) to (3-6) may be applied to each of the corresponding coils.

A method of calculating the electric current Ij satisfying the equations (3-1) to (3-6) will be described.

Further, some notations are used here.

First, the followings are defined.

i: torque index (1 to 6, 1: X-axis, 2: Y-axis, 3: Z-axis, 4: Wx-axis, 5: Wy-axis, 6: Wz-axis)

Ki: element of vector K having six elements

M: matrix having elements in six rows and j columns

M (i, j): elements in i rows and j columns of matrix M

Inv: inverse matrix

Tr: transposed matrix

*: multiplication of row and scalar element

Using each unit vector, a matrix M having the following matrix elements is defined.

$$M(1,j) = -Eq(j,\theta) * \mathrm{Sin}\varphi j + Ed(j,\theta) * \mathrm{Cos}\varphi j \tag{4-1}$$

$$M(2,j) = Eq(j,\theta) * \mathrm{Cos}\varphi j + Ed(j,\theta) * \mathrm{Sin}\varphi j * Ij \tag{4-2}$$

$$M(3,j) = Ez(j,\theta) \tag{4-3}$$

$$M(4,j) = Ed(j,\theta) * r * \mathrm{Sin}\varphi j \tag{4-4}$$

$$M(5,j) = Eq(j,\theta) * r * \mathrm{Cos}\varphi j \tag{4-5}$$

$$M(6,j) = Eq(j,\theta) \tag{4-6}$$

Then, using the equations (4-1) to (4-6), the equations (3-1) to (3-6) can be expressed as follows.

$$Tq = M * Is \tag{5-1}$$

Currently, the matrix M is a square matrix of six rows and six columns since the number of coils (j) is six. Therefore, if the equation (5-1) is transformed into the following equation (5-2), the current vector Is can be uniquely determined.

$$Inv(M) * T = Inv(M) * M * Is = Is \tag{5-2}$$

In this way, the 6-axis torque vector Tq can be applied even in a case where the rotor 101 is at any angle θ, and the rotation speed and the attitude in a three-dimensional direction of the rotor 101 can be controlled.

Performing the above-described control makes it possible to dynamically control the attitude of the rotor 101 in real time while rotating the rotor 101 at a desired speed including a standstill in a floating state with respect to the stator 201.

Next, a second exemplary embodiment will be described.

In the first exemplary embodiment, the example in which the number of the coils 204 is six is described. However, the number of the coils may be seven or more in a case where it is desired to output torque more smoothly or there are limitations such as the shape of the coil.

If the number of the coils (j) is seven or more, there will be countless coil current vectors Is satisfying the equation (5-1) described in the first exemplary embodiment. In that case, a method of constantly deriving the coil current vector Is is desirable.

Here, the column elements (M (1, j), M (2, j), M (3, j), M (4, j), M (5, j), M (6, j)) at the j-th coil of the matrix M indicate the magnitude of a contribution to the torque of each axis when the unit electric current is applied to the coil 204-*j* of the j-th coil. The torques of the respective axes are (Tx, Ty, Tz, Twx, Twy, Twz).

Thus, if the following equation (5-3) is established using the vector K having six column elements, the equation (5-1) described in the first exemplary embodiment can be transformed into the following equation (5-4).

$$Tr(M) * K = Is \tag{5-3}$$

$$Tq = M * Is = M * Tr(M) * K \tag{5-4}$$

Based on the property of the product of symmetric matrices, "M*Tr(M)" is a square matrix of six rows and six columns, and always has the inverse matrix because the rank of the matrix is always 6. Therefore, the equation (5-4) can be solved as the following equation (5-5), and thus K can be uniquely calculated.

$$Inv(M*Tra(M))*Tq=K \tag{5-5}$$

Eventually, the following equation (5-6) can be calculated, and thus the current vector Is can be uniquely determined.

$$Tra(M)*Inv(M*Tr(M))*T=Is \tag{5-6}$$

In this way, the 6-axis torque vector Tq can be applied to the rotor 101, and thus the rotation speed and the attitude in the three-dimensional direction of the rotor 101 can be controlled.

Next, a third exemplary embodiment will be described. In the present exemplary embodiment, an example in which the shape of a permanent magnet is different from that of the first exemplary embodiment will be described. A configuration having the same effect as that of the first exemplary embodiment will be assigned the same reference numeral as that of the first exemplary embodiment, and the description thereof will be omitted.

Figure 8:
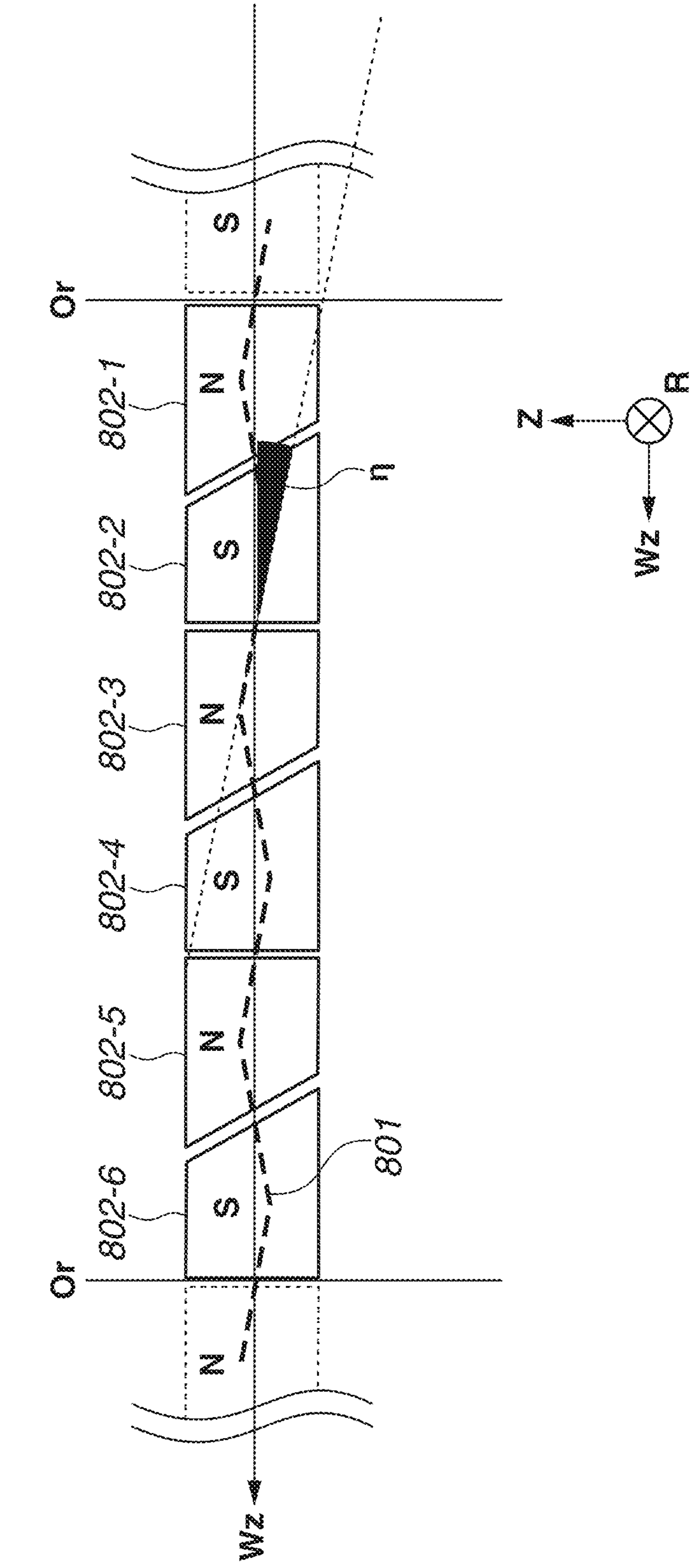
FIG. 8 is a schematic diagram illustrating a third exemplary embodiment of the present invention.

FIG. 8 is a diagram schematically illustrating an arrangement of permanent magnets 802 according to the third exemplary embodiment, and schematically illustrates an outer peripheral portion 105*c* of a base portion in a developed manner.

In comparison with the permanent magnet 102 of the first exemplary embodiment, a permanent magnet 802 of the third exemplary embodiment has a trapezoidal shape, and the number of the permanent magnets 802 can be thereby reduced. Thus, the manufacturing process can be more simplified.

Even in a case where such an arrangement is adopted, if thrust constants (Eq, Ed, Ez) of each coil corresponding to the rotation angle θ of a rotor 101 are acquired beforehand as described in the first exemplary embodiment or the second exemplary embodiment, it is possible to rotate the rotor 101 while stabilizing the attitude of the rotor 101 by a similar control method.

A characteristic illustrated in FIG. 8 is that a line 801 passing through the center of gravity of each of the permanent magnets 802 has an angle (n) of a certain degree or more with respect to the rotation direction.

Figure 9:
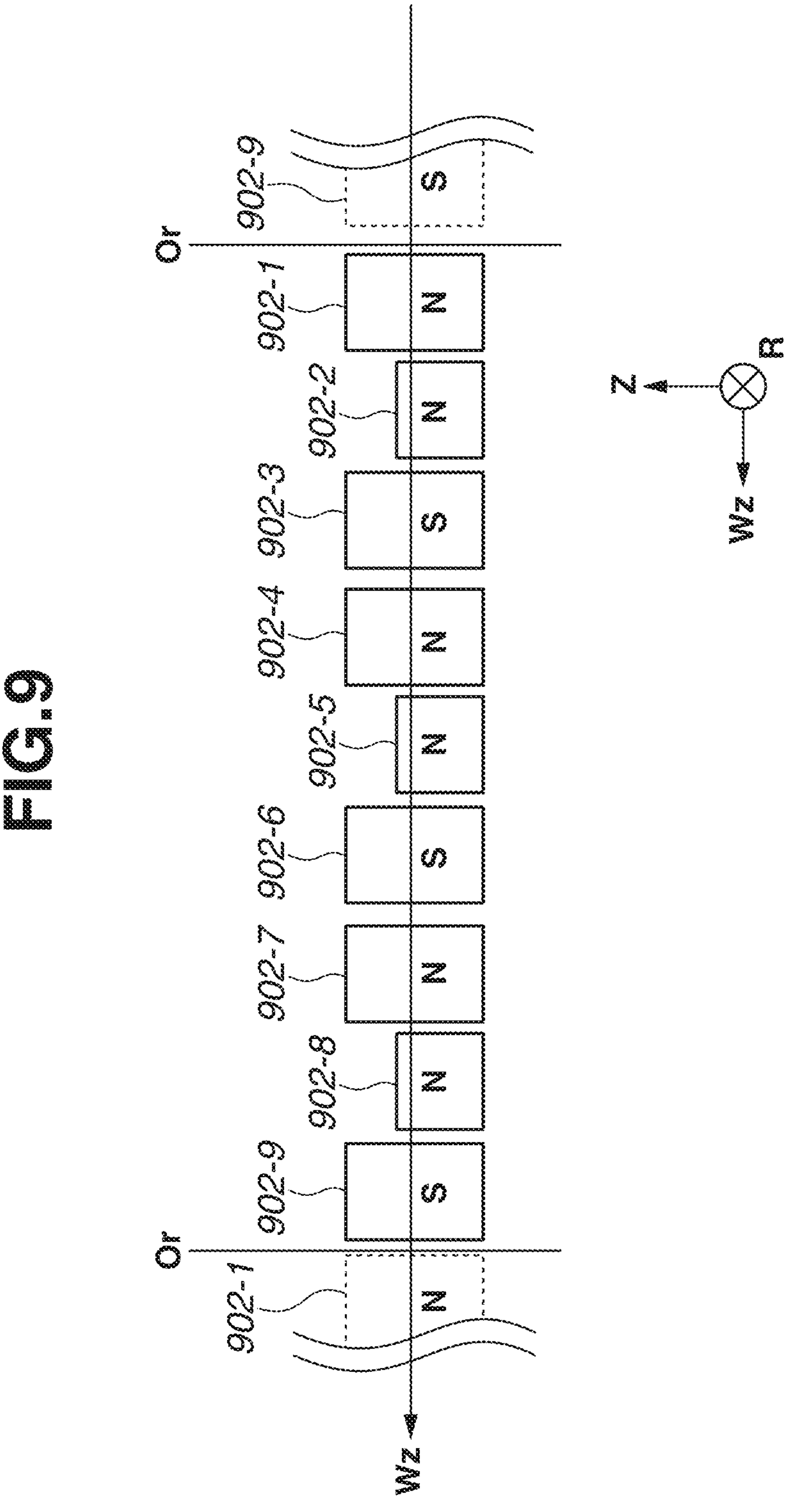
FIG. 9 is a schematic diagram illustrating a modification of the third exemplary embodiment of the present invention.

Similarly, by using permanent magnets 902 arranged as illustrated in FIG. 9 as a modification of the third exemplary embodiment, a force in the Z-axis direction can be applied. Such a configuration is useful in a case where a simpler configuration than that of the first exemplary embodiment is desired.

FIG. 9 is a diagram schematically illustrating the arrangement of the permanent magnets 902 of the rotor 101 according to the modification of the third exemplary embodiment, and schematically illustrates the outer peripheral portion 105*c* of the base portion in a developed manner.

A permanent magnet 902 is magnetized in a direction of a surface facing the coil as illustrated in FIG. 9. Specifically, as with the first exemplary embodiment, in each of the permanent magnets 902-1, 902-4, and 902-7, the surface facing the coil is magnetized to the N-pole, and in each of the permanent magnets 902-3, 902-6, and 902-9, the surface facing the coil is magnetized to the S-pole. In the first exemplary embodiment, there is described the example in which the permanent magnets 102-2, 102-5, and 102-8 are each divided into two in the Z-axis direction, and each of the permanent magnets 102-2, 102-5, and 102-8 is magnetized to the N-pole and the S-pole. However, the permanent magnets 902-2, 902-5, and 902-8 according to the present modification are magnetized only to the N-pole and are disposed such that the center of gravity is deviated downward. In the present modification, the permanent magnets 902-2, 902-5, and 902-8 are magnetized to the N-pole, but it is needless to say that the permanent magnets 902-2, 902-5, and 902-8 may be magnetized to the S-pole.

The force in the Z-axis direction can be thereby applied in the configuration simpler than that in the first exemplary embodiment.

Next, a fourth exemplary embodiment will be described. A configuration having the same effect as that of the first exemplary embodiment will be assigned the same reference numeral as that of the first exemplary embodiment, and the description thereof will be omitted.

Figure 10:
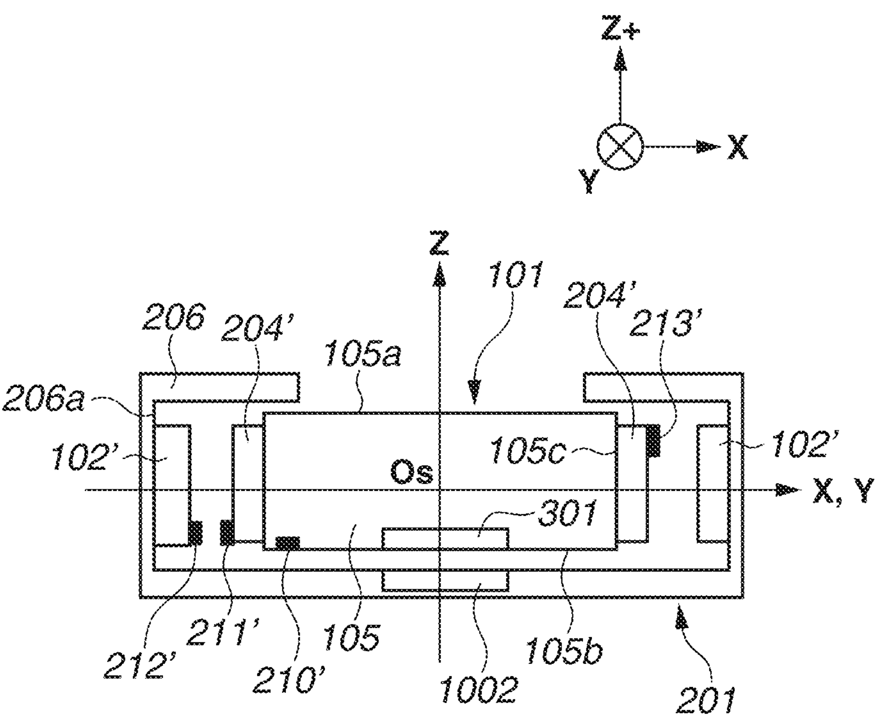
FIG. 10 is a schematic diagram illustrating a fourth exemplary embodiment of the present invention.

In each of the first to third exemplary embodiments, there is described the example in which the permanent magnet 102 is on the rotor 101 side and the coil 204 is on the stator 201 side as illustrated in FIG. 1. In the present exemplary embodiment, an example in which a coil 204' is on the rotor 101 side and a permanent magnet 102' is on the stator 201 side as illustrated in FIG. 10 will be described. In this arrangement as well, a motor of magnetic levitation type can be provided as in the first to third exemplary embodiments.

In FIG. 10, the permanent magnet 102' is fixed on the stator 201 side. The coil 204' is fixed on the rotor 101 side. A Wz-sensor 211' is on the rotor 101 side, and a scale 212' is on the stator 201 side. A Z-sensor 210', an X-sensor 213', and a Y-sensor 214' (not illustrated) are also fixed on the rotor 101 side.

A motor controller 301 is disposed on the rotor 101 side and configured to be able to communicate with a wireless unit 1002. The motor controller 301 has a battery (not illustrated) and can rotate for a certain period of time. If the wireless unit 1002 has a power transmission function, the rotor 101 can be rotated without the need of charging.

A fifth exemplary embodiment will be described with reference to FIGS. 11A and 11B. A configuration having the same effect as that of the first exemplary embodiment will be assigned the same reference numeral as that of the first exemplary embodiment, and the description thereof will be omitted.

The motor is described in the first to fourth exemplary embodiments, but in the present exemplary embodiment, an article having the motor described in the first to fourth exemplary embodiments will be described. In the present exemplary embodiment, an example in which the article including the motor described in the first to fourth exemplary embodiments is applied to a pump will be described.

Figure 11A:
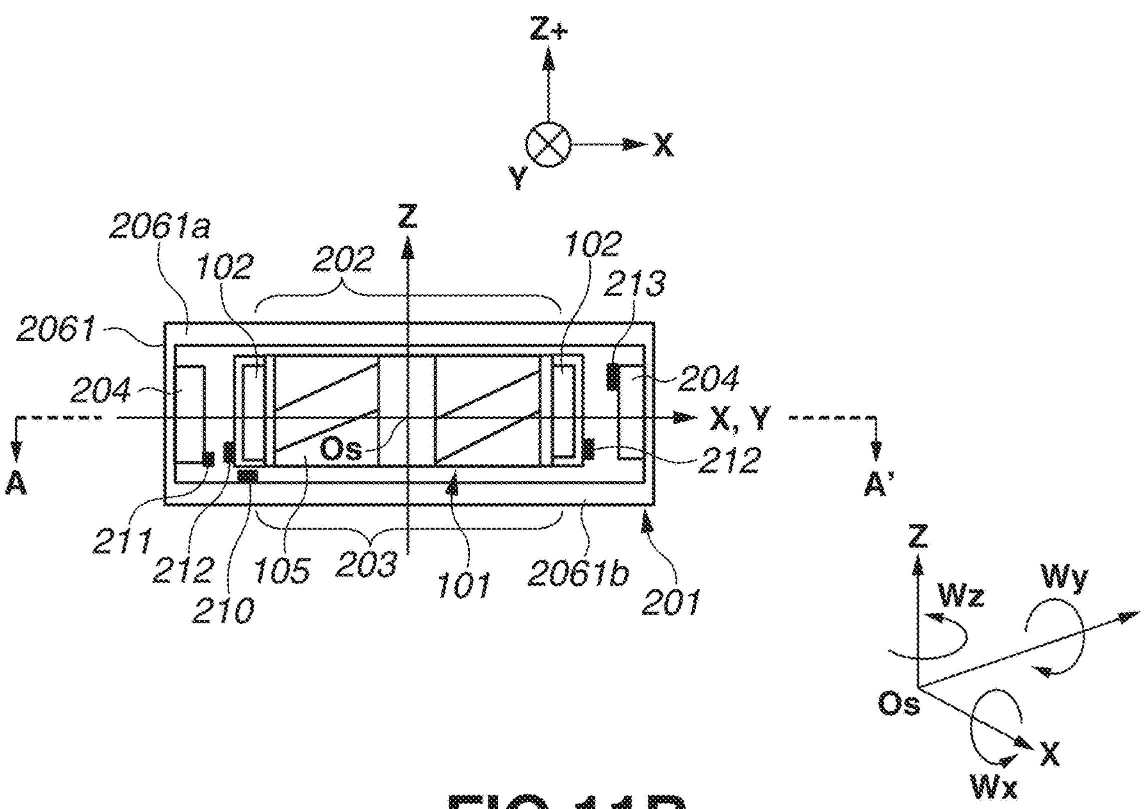
FIG. 11A is a schematic diagram illustrating a fifth exemplary embodiment of the present invention.
Figure 11B:
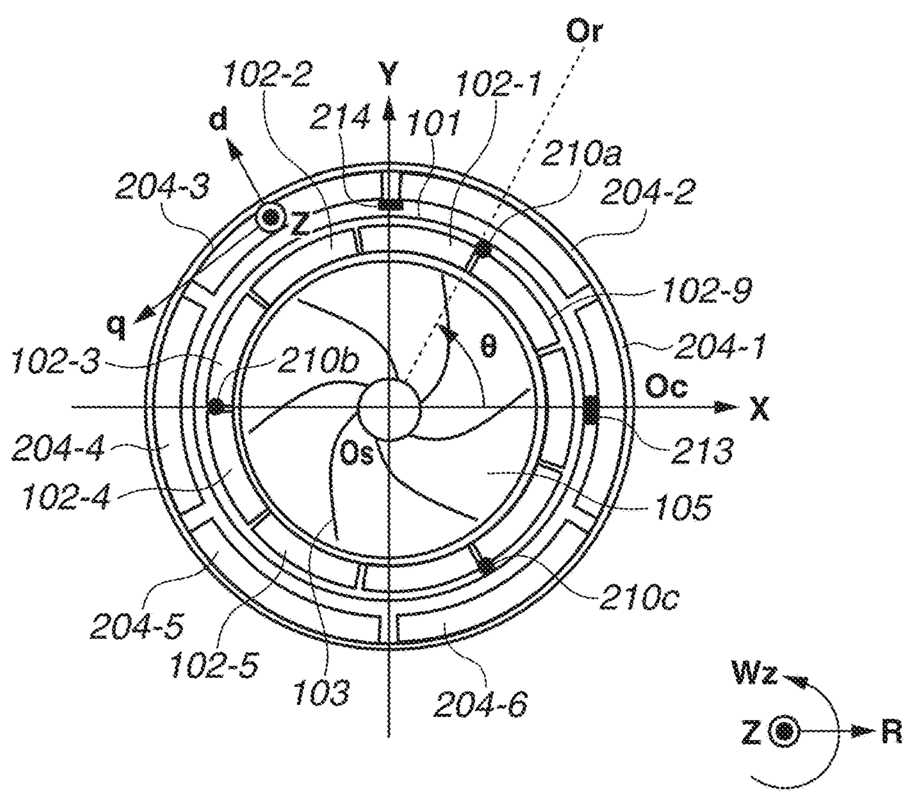
FIG. 11B is a schematic diagram illustrating the fifth exemplary embodiment of the present invention.

FIGS. 11A and 11B are conceptual diagrams illustrating the pump. FIG. 11A is a longitudinal cross-sectional conceptual diagram, and FIG. 11B is a cross-sectional conceptual diagram along A-A' in FIG. 11A.

A fin 103 is formed on a base portion 105 of a rotor 101.

A stator 201 is provided with a housing 2061 to cover the rotor 101. The housing 2061 has a side wall portion having an inner peripheral portion to which the coil is attached, and a first wall portion 2061*a* and a second wall portion 2061*b* that are connected to the side wall portion A hole is formed in part of the first wall portion 2061*a* as an inlet 202, and a hole is formed in the second wall portion 2061*b* as an outlet 203. Thus, when the rotor 101 rotates in a predetermined direction in a fluid, the fluid flows in from the inlet 202 and flows out from the outlet 203, and thus the article acts as the pump.

In addition, as a modification of the article, for example, a tire or the like can be attached to the rotor 101 (or a rotor 201 as described above). In that case, the motor of the present invention can function as a component of a vehicle such as a car or an aircraft such as a drone.

A sixth exemplary embodiment will be described with reference to FIGS. 12A and 12B. A configuration having the same effect as that of the first exemplary embodiment will be assigned the same reference numeral as that of the first exemplary embodiment, and the description thereof will be omitted.

The example in which the rotor 101 is inside the stator 201 is described in the first exemplary embodiment, but in the present exemplary embodiment, an example in which a stator 201 is inside a rotor 101 will be described.

Figure 12A:
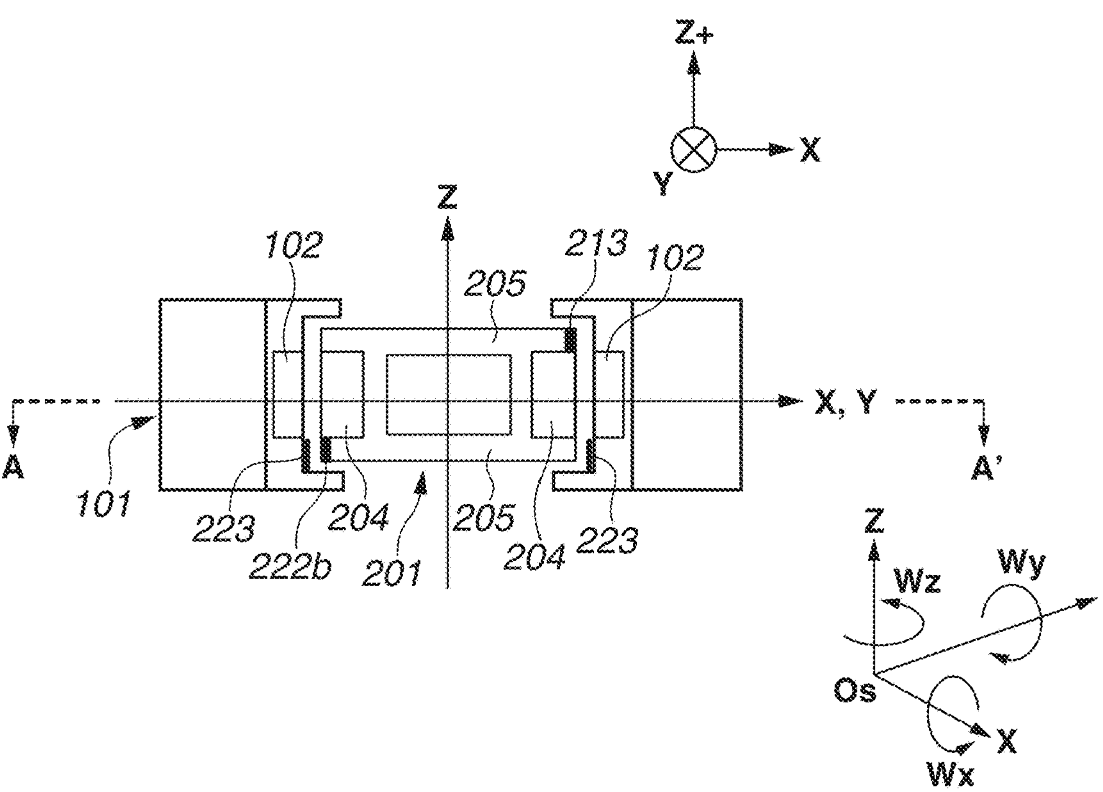
FIG. 12A is a schematic diagram illustrating a sixth exemplary embodiment of the present invention.
Figure 12B:
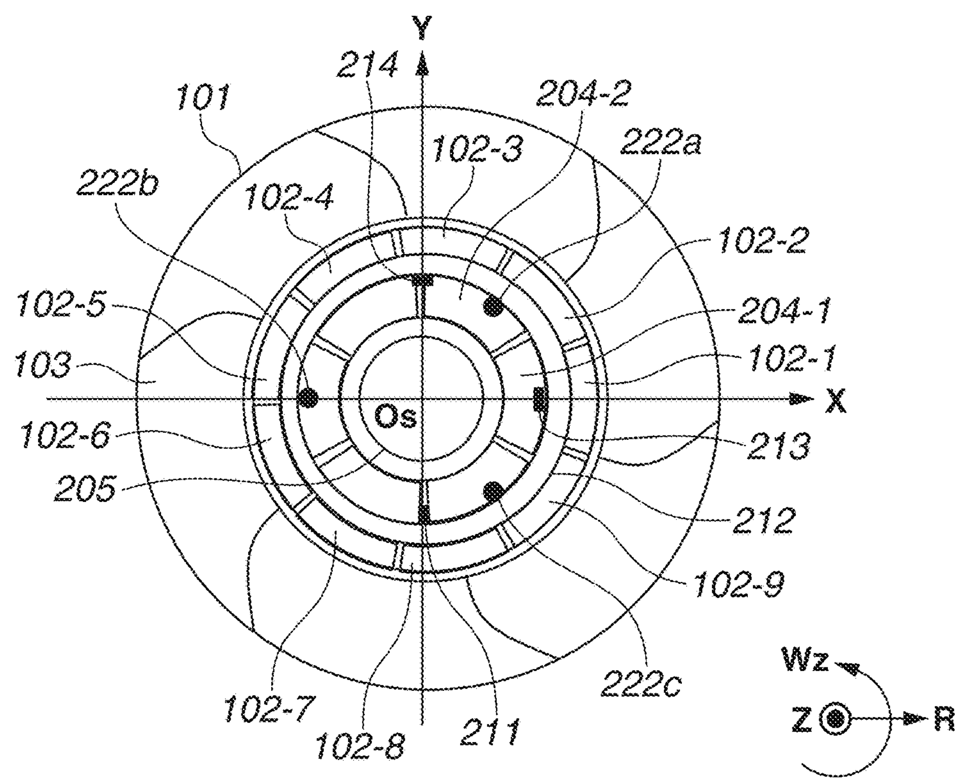
FIG. 12B is a schematic diagram illustrating the sixth exemplary embodiment of the present invention.

FIGS. 12A and 12B are conceptual diagrams illustrating the sixth exemplary embodiment. FIG. 12A is a longitudinal cross-sectional conceptual diagram, and FIG. 12B is a cross-sectional conceptual diagram along A-A' in FIG. 12A.

FIGS. 12A and 12B are different from FIGS. 1A and 1B in that the stator 201 is inside the rotor 101.

Another difference is that, while the sensor for measuring the distance of the gap in the Z-axis direction between the rotor and the stator is used as the Z-sensor 210 in the first exemplary embodiment, a sensor for measuring the distance of a gap between the outer peripheral portion of the stator and the inner peripheral portion of the rotor is used as a Z-sensor 222 of the present exemplary embodiment. A Z-scale 223 is attached to a side surface (the inner peripheral portion) facing the Z-sensor 222 on the rotor 101 side. The Z-sensor 222 can read a pattern of the Z-scale 223 and detect a displacement of the rotor 101 in the Z-axis direction with respect to the Z-sensor 222.

The Z-sensor 222 can detect displacement (Z, Wx, Wy) of the rotor 101 from a side surface (the outer peripheral portion) of the stator 201. In other words, because there is no interfering member in the Z-axis direction, the rotor 101 can be removed by being moved in the Z-axis direction.

In this configuration, the stator 201 can be reduced in size, and the fin 103 of various specifications can be formed.

In addition, while the example of the pump in which the fin 103 is formed on the peripheral portion of the rotor is described in the present exemplary embodiment, the present exemplary embodiment is also applicable to a vehicle such as a car in which a tire or the like is attached in place of the fin 103.

In the sixth exemplary embodiment, the article can be used in a state where one of walls 205 of the stator 201 is attached and fixed to a frame or the like (not illustrated).

A seventh exemplary embodiment will be described with reference to FIG. 13. A configuration having the same effect as that of the first exemplary embodiment will be assigned the same reference numeral as that of the first exemplary embodiment, and the description thereof will be omitted.

Figure 13:
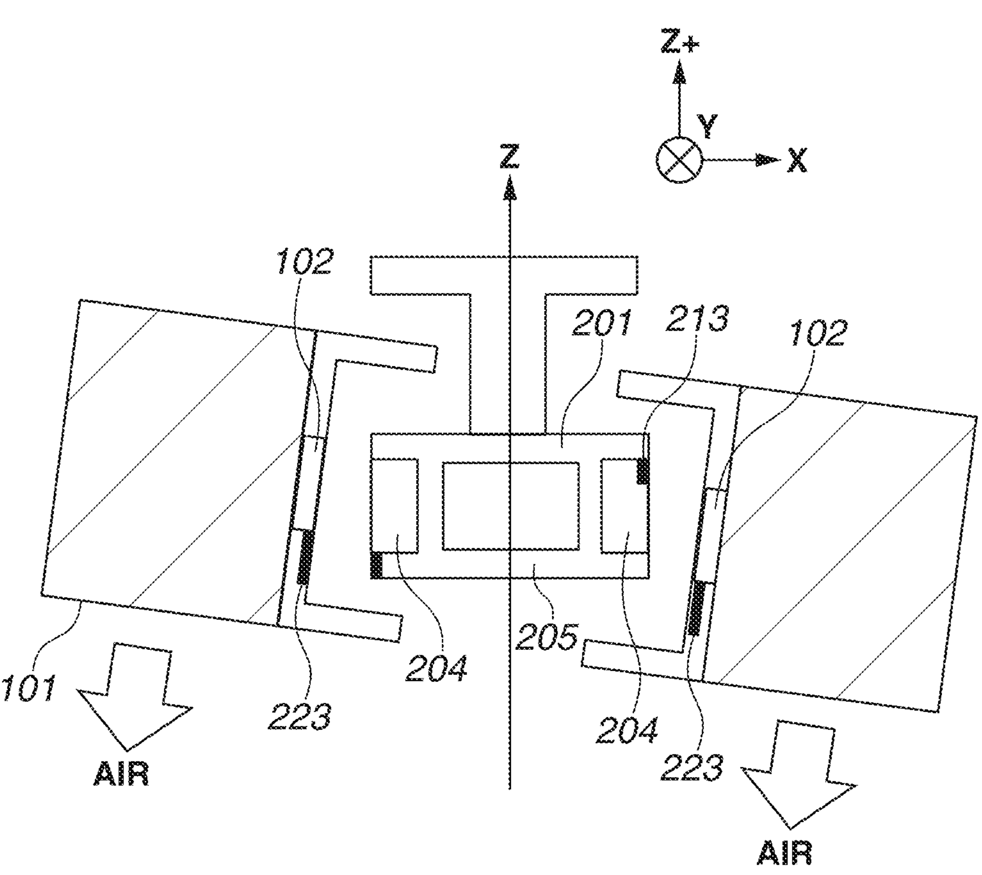
FIG. 13 is a schematic diagram illustrating a seventh exemplary embodiment of the present invention.
Figure 13:
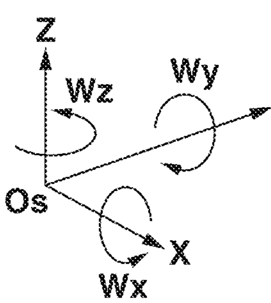

FIG. 13 is different from FIG. 12A in that a gap between a rotor 101 and a stator 201 is wider.

In this configuration, the rotor 101 can be rotated even in a state where the rotor 101 is intentionally tilted to a great extent, and it is therefore possible to tilt the rotation axis of the rotor 101 from the Z-axis without changing the angle of the stator 201. If such a configuration is adopted, for example, a direction of exhaust air can be freely changed by applying the configuration to an aircraft such as a drone or airplane that is capable of vertically taking off and landing, so that a high degree of freedom of navigation is possible.

The present invention is not limited to the above-described embodiments, and various changes and modifications can be made within the spirit and scope of the present invention. Therefore, the following claims are attached to make the scope of the present invention public.

According to the present invention, the rotor can be rotated in a contactless manner by a simple structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A motor including a first part having an outer peripheral portion and a second part having an inner peripheral portion facing the outer peripheral portion, the first part and the second part being configured to rotate relative to each other about a rotation axis, the motor comprising:

a coil array including a plurality of coils and arranged along a rotation direction on one of the outer peripheral portion and the inner peripheral portion; and a magnet array including a plurality of magnets and arranged, along the rotation direction and at a position at which the magnet array is disposed facing the coil array, on the other of the outer peripheral portion and the inner peripheral portion, wherein the magnet array includes a plurality of first magnets configured to contribute to generation of a thrust applied in the rotation direction and a second magnet which is arranged between magnets included in the plurality of first magnets and which is configured to contribute to generation of a thrust applied in a direction along which the rotation axis is disposed.

2. The motor according to claim 1 wherein magnets of which the plurality of first magnets is composed are arranged to be alternately magnetized along the rotation direction.

3. The motor according to claim 1, wherein the first part is a rotor and the second part is a stator.

4. The motor according to claim 3, wherein the rotor rotates in a state where the rotor is levitating over the stator.

5. The motor according to claim 3, wherein a rotation speed and an attitude in a three-dimensional direction of the rotor with respect to the stator are controlled by an electromagnetic force acting between the plurality of first magnets as well as the second magnet and the coil array.

6. The motor according to claim 1, wherein the first part is a stator and the second part is a rotor.

7. The motor according to claim 6, wherein the rotor rotates in a state where the rotor is levitating over the stator.

8. The motor according to claim 5, wherein the attitude in the three-dimensional direction includes a position in a Z-axis direction parallel with a rotation axis of the rotor, an X-axis direction orthogonal to the Z-axis direction, and a Y-axis direction orthogonal to the X-axis direction and the Z-axis direction, and a rotation angle.

9. The motor according to claim 1, wherein the second magnet is included in a plurality of the second magnets and the plurality of first magnets includes a pair of magnets between which a magnet included in the plurality of the second magnets is not arranged.

10. The motor according to claim 1, wherein the second magnet is included in a plurality of the second magnets and the plurality of the second magnets is arranged in a manner such that each magnet has a polarity different from a polarity of an adjacent magnet along the direction along which the rotation axis is disposed.

11. The motor according to claim 1, wherein the second magnet is included in a plurality of the second magnets and the plurality of the second magnets is eccentrically arranged with respect to a line passing through a center of the plurality of first magnets in the direction along which the rotation axis is disposed.

12. An article comprising the motor according to claim 1.

13. The article according to claim 12, wherein a fin is formed in the motor.

14. The article according to claim 12, wherein a tire is attached to the motor.

* * * * *